Patented Apr. 16, 1940

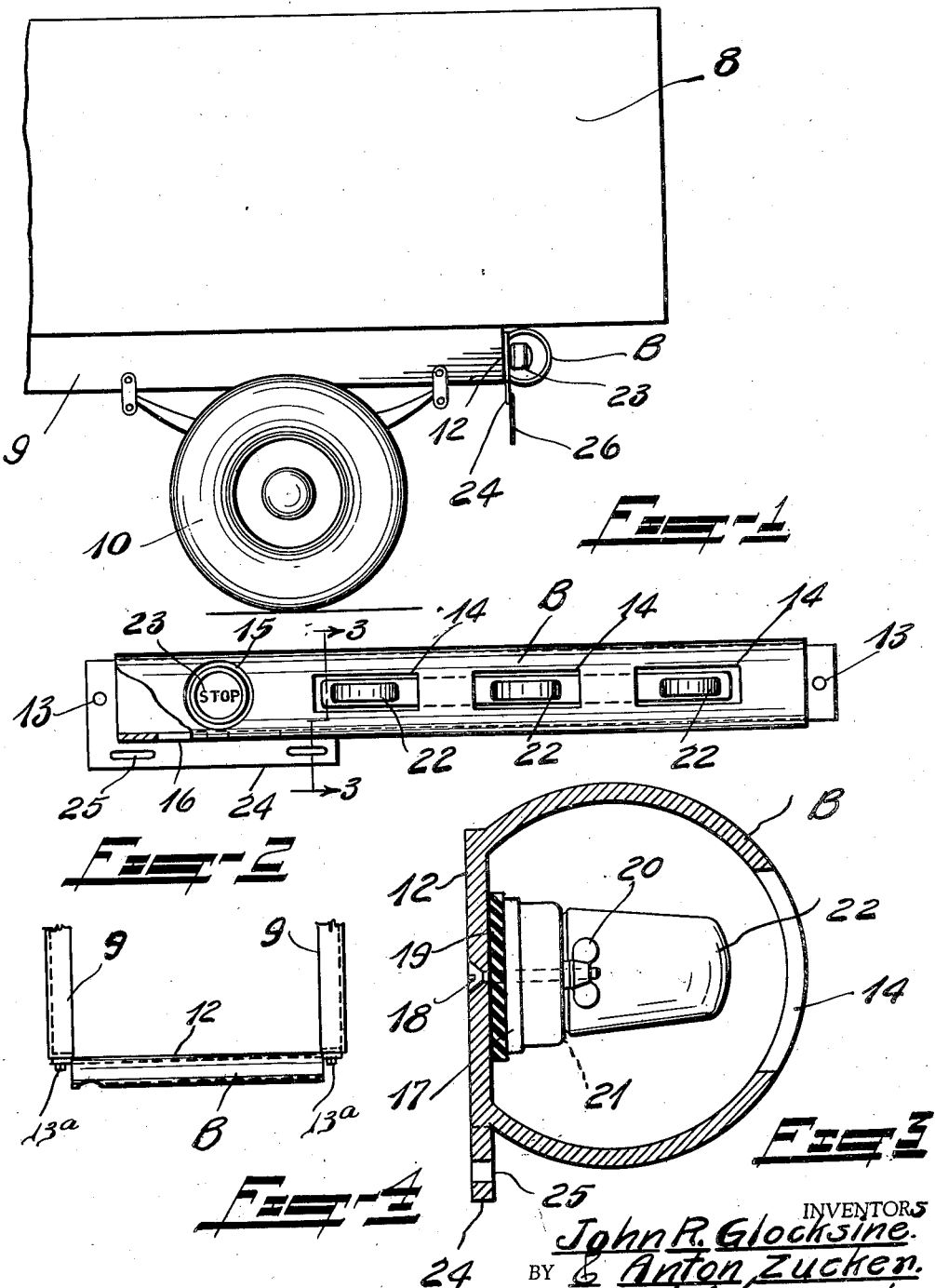

2,197,038

UNITED STATES PATENT OFFICE 2,197,038

GUARD AND ROAD-LIGHT PROTECTIVE DEVICE

John R. Glocksine and Anton Zucker, Bay City, Mich.

Application February 19, 1938, Serial No. 191,364

5 Claims. (Cl. 240—7.1)

This invention relates to means for protecting road lights against breakage, and more particularly to the rear lights on trucks used for transporting goods from place to place.

One of the prime objects of the invention is to design a combined brace and light protector on an automotive vehicle to prevent breakage when the vehicle backs into platforms or other obstacles, or is bumped by another vehicle, this insuring lights at all times, and eliminating the danger of accidental rear end collisions which are primarily due to the fact that the lights are damaged and broken and that the driver is not aware thereof.

Another object is to provide a rugged and substantial combined brace and light protector in which the road lights and stop light are resiliently mounted, so that the shock of any contact with a platform or any obstacle, either stationary or moving, will be taken by the brace without striking or affecting the lights mounted therein.

A further object is to provide a combined brace and light protector which can also be used as a cross member for the rear end of the frame, thereby reinforcing said frame as well as serving as a mounting for the road lights, stop light and license plate.

A still further object is to provide a combined brace and light protector in which the lights can be mounted as a unit so that they can be readily mounted and/or removed for the purpose of repair, replacement or cleaning, and which brace protects the lights from stones and/or pebbles thrown by the wheels of the truck on which the brace is mounted or by passing vehicles.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a fragmentary side elevational view of an automotive truck showing our improved combined brace and light protector mounted on and serving as a rear cross member for the frame.

Fig. 2 is an enlarged detail face view of the combined brace and light protector.

Fig. 3 is an enlarged transverse sectional view taken on the line 3—3 of Fig. 2.

Fig. 4 is a top plan view showing the combined brace and light protector in place as a cross member of the vehicle frame.

It is at present general practice to operate truck lines twenty-four hours per day, consequently, a great deal of freight is transported during the night when it is absolutely essential from the standpoint of safety, both for vehicles and human life, that the lights on the vehicles be in operating condition, because if the lights are broken or damaged, collisions and loss of life and property very often occur, and we have therefore, perfected a rugged and substantial brace and mounting in which the road lights are resiliently mounted so that said lights are fully protected from injury, and in which vibration due to rough roads is greatly reduced.

Referring now more particularly to the drawing in which we have shown the preferred embodiment of our invention, the numeral 8 indicates an automotive truck of conventional design, and includes a frame 9 supported on wheels 10 as usual.

In the present instance we have shown the combined brace and light protector used as the rear cross member for the frame, (see Figs. 1 and 4) although it will be understood that it can be placed in any desired position on the frame or vehicle body.

The brace B is preferably semi-cylindrical in shape, and is of a length to span the vehicle frame, the back face or base 12 being flat with the end sections projecting slightly beyond the main body and provided with openings 13 to accommodate bolts 13a to facilitate attachment to the vehicle.

A plurality of rectangular shaped openings 14 are provided in the face of the brace member, and an enlarged opening 15 is provided adjacent the end, similar elongated openings 16 being provided in the lower side and for a purpose to be presently described.

An elongated light support 17 is mounted on the inner surface of the flat base by means of screws 18, and a strip of resilient material 19 is interposed between the base and the light support to eliminate vibration which prolongs the life of the light bulbs, a butterfly nut 20 being threaded on the screw 18 to facilitate the securing thereof. Sockets 21 are provided in the support 17 in spaced relation and bulbs 22 are mounted therein, and we wish to direct particular attention to the fact that these bulbs do not project beyond the wall of the brace member, but are entirely confined therein, so that contact with any part of said brace does not disturb or injure the bulbs.

A stop light 23 can be provided at the one end of the brace member, and the rays of the stop light shine through the openings 16 provided in the lower face of the brace, all of these lights being connected to the lighting system of the vehicle in the usual manner. A depending section 24 can also be formed integral with the flat base 12, and is provided with slotted openings 25 to facilitate the attachment of the license plate shown at 26 in Fig. 1, the light rays from the stop light shining directly across the face of said plate.

If desired this stop light and plate attachment section can be eliminated.

From the foregoing description, it will be clearly obvious that we have perfected a very rugged, substantial and economical combined brace and light protector for attachment to the rear of an automotive vehicle to protect the lights from injury.

What we claim is:

1. A combined light, brace and light protector for vehicles comprising a relatively heavy semi-tubular shaped, elongated body, hollow from end to end, and having a flat attaching surface, the ends of which are rigidly secured to the rear ends of the vehicle frame whereby the hollow body forms a transversely disposed brace, a plurality of elongated openings in the face of the hollow body, an elongated light socket strip detachably mounted in said body and removable endwise therefrom, and a plurality of light bulbs mounted in said sockets in alignment with the elongated openings in said body and confined within the hollow body.

2. A combined light, brace and light protector for vehicle trucks comprising a rigid, metallic hollow body formed with a flat attaching surface, the ends of which are rigidly secured to the ends of the truck frame whereby the hollow body forms a rigid, transversely disposed cross-brace, a plurality of spaced apart openings in the body, a light socket base removably mounted within the hollow body as a unit and secured to the flat surface thereof, a plurality of light bulbs mounted on the socket strip in alignment with said openings, but entirely confined within said hollow body, and means for securing the light socket base in position.

3. A combined light, brace and light protector for attachment to the rear end of a vehicle, and comprising a horizontally disposed, relatively heavy, semi-tubular, hollow body member provided with flat sections projecting beyond the ends of the semi-tubular portion, said projecting sections being rigidly connected to the rear ends of the vehicle frame whereby the hollow body forms a rigid, transversely disposed brace therefor, a plurality of openings in the horizontally disposed face of the body member, an elongated light socket strip unit detachably mounted in said hollow body and removable endwise therefrom, light bulbs mounted in said unit in alignment with said openings and confined within the hollow body, and slots in the lower edge of the body member so that the light rays from one of said lights will be reflected downwardly toward the roadway.

4. A combined light, brace and light protector for attachment to the rear ends of a vehicle frame, and comprising a rigid, elongated, hollow body member having flat attaching sections projecting beyond the ends of the hollow portion, said projecting end sections being rigidly connected to the rear ends of the vehicle frame whereby the hollow body forms a rigid, transversely disposed brace and cross member, a plurality of openings in the face of said body member, an elongated light socket unit detachably mounted in said hollow member and removable endwise therefrom, a resilient strip interposed between said unit and the attaching surface, light bulbs in said unit in alignment with the openings in the face of the rigid body and confined within the hollow body, and a flat depending section cast integral with said body member to permit attachment of a license plate thereto.

5. A combined light, brace and light protector for mounting and protecting the rear road lights of an automotive vehicle and comprising a rigid, elongated, hollow body member formed with flat projecting end sections, said end sections being rigidly secured to the vehicle frame whereby the hollow body forms the rear cross-brace of said vehicle frame, a depending flat section on one end of the body member, a plurality of openings in the horizontal face of said hollow member, an elongated light socket unit removably mounted in said member, a resilient strip interposed between said unit and the wall of the body member, a plurality of light bulbs mounted in the sockets and in alignment with the said openings, said bulbs being entirely confined within the hollow member, and slotted openings in the lower face of the hollow body member directly above the depending section, so that light rays from the lights may be reflected downwardly and across the face thereof.

JOHN R. GLOCKSINE.
ANTON ZUCKER.